(12) United States Patent
Kawanishi

(10) Patent No.: US 10,416,387 B2
(45) Date of Patent: Sep. 17, 2019

(54) OPTICAL FIBER CUTTING SYSTEM

(71) Applicant: FUJIKURA LTD., Tokyo (JP)

(72) Inventor: Noriyuki Kawanishi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 80 days.

(21) Appl. No.: 15/534,308

(22) PCT Filed: Feb. 15, 2017

(86) PCT No.: PCT/JP2017/005498
§ 371 (c)(1),
(2) Date: Jun. 8, 2017

(87) PCT Pub. No.: WO2018/083816
PCT Pub. Date: May 11, 2018

(65) Prior Publication Data
US 2018/0259711 A1    Sep. 13, 2018

(30) Foreign Application Priority Data

Nov. 2, 2016  (JP) ................................. 2016-214849

(51) Int. Cl.
*G02B 6/25* (2006.01)
*B26D 1/04* (2006.01)
(Continued)

(52) U.S. Cl.
CPC .............. *G02B 6/25* (2013.01); *B26D 1/045* (2013.01); *B26D 1/18* (2013.01); *B26D 1/185* (2013.01);
(Continued)

(58) Field of Classification Search
CPC ........ B26D 1/0425; B26D 1/18; B26D 1/185; B26D 1/225; B26D 3/06; B26D 3/08;
(Continued)

(56) References Cited

U.S. PATENT DOCUMENTS 4,691,987 A    9/1987  Ebner et al.
5,188,268 A *  2/1993  Hakoun ................... B26D 7/14
                                                     225/105
(Continued)

FOREIGN PATENT DOCUMENTS

CN    1386207 A    12/2002
CN    1388389 A     1/2003
(Continued)

OTHER PUBLICATIONS

Office Action in counterpart Japanes Application No. 2017-150229 dated Aug. 29, 2017 (3 pages).
(Continued)

*Primary Examiner* — Omar Flores Sanchez
(74) *Attorney, Agent, or Firm* — Osha Liang LLP

(57) ABSTRACT

An optical fiber cutting system includes a pair of clamps disposed at an interval in a longitudinal direction of an optical fiber and that grasps the optical fiber; a disk-shaped blade member that passes between the pair of clamps, causes an outer circumferential edge to come into contact with the optical fiber, and scratches a surface of the optical fiber, where a position of the outer circumferential edge which is to be in contact with the optical fiber is changeable; a pressing member that press-bends a scratched portion of the optical fiber and cuts the optical fiber, and an acquirer that acquires position information of the outer circumferential edge which is to be in contact with the optical fiber.

11 Claims, 8 Drawing Sheets

(51) Int. Cl.
  *B26D 1/18* (2006.01)
  *B26D 1/22* (2006.01)
  *B26D 3/06* (2006.01)
  *B26F 3/00* (2006.01)
  *B26D 3/08* (2006.01)
  *B26D 5/02* (2006.01)
  *B26D 7/26* (2006.01)
  *G02B 6/255* (2006.01)

(52) U.S. Cl.
  CPC ............. *B26D 1/225* (2013.01); *B26D 3/06* (2013.01); *B26D 3/08* (2013.01); *B26D 5/02* (2013.01); *B26D 7/2635* (2013.01); *B26F 3/002* (2013.01); *G02B 6/255* (2013.01)

(58) Field of Classification Search
  CPC ......... B26D 5/02; B26D 7/2635; B26F 3/002; G02B 6/25; G02B 6/255
  See application file for complete search history.

(56) References Cited

U.S. PATENT DOCUMENTS

| | | | |
|---|---|---|---|
| 5,253,412 A | 10/1993 | Fukuoka et al. | |
| 6,553,880 B2* | 4/2003 | Jacobsen | A61M 25/0009 451/10 |
| 6,751,395 B1 | 6/2004 | Novotny et al. | |
| 7,070,078 B2* | 7/2006 | Song | B26D 1/18 225/105 |
| 7,828,926 B1* | 11/2010 | Gaysinskiy | B26D 7/1827 15/104.002 |
| 8,191,451 B2* | 6/2012 | Stolyar | B26D 7/2635 83/499 |
| 8,196,793 B2* | 6/2012 | Ohmura | B26F 3/002 225/103 |
| 9,395,492 B2* | 7/2016 | Hasegawa | G02B 6/25 |
| 9,539,737 B2* | 1/2017 | Ravat | B29D 30/46 |
| 9,541,710 B2* | 1/2017 | Sasaki | G02B 6/3616 |
| 9,885,833 B2* | 2/2018 | Vallance | B26D 3/08 |
| 2006/0201986 A1 | 9/2006 | Sasaki et al. | |
| 2010/0044406 A1 | 2/2010 | Ohmura et al. | |
| 2015/0323740 A1 | 11/2015 | Zhao | |

FOREIGN PATENT DOCUMENTS

| | | |
|---|---|---|
| CN | 1580846 A | 2/2005 |
| CN | 103329015 A | 9/2013 |
| CN | 207181741 U | 4/2018 |
| JP | S63-019802 U | 2/1988 |
| JP | H04-314006 A | 11/1992 |
| JP | H06-186436 A | 7/1994 |
| JP | 2850910 B2 | 1/1999 |
| JP | 2001-318237 A | 11/2001 |
| JP | 2001-356215 A | 12/2001 |
| JP | 2006-58474 A | 3/2006 |
| JP | 2006-251034 A | 9/2006 |
| JP | 4383289 B2 | 12/2009 |
| JP | 4446142 B2 | 4/2010 |
| JP | 4652945 B2 | 3/2011 |
| JP | 2012-168261 A | 9/2012 |

OTHER PUBLICATIONS

Extended Search Report issued in European Application No. 17725493.5, dated Aug. 31, 2018 (9 pages).
Office Action issued in Korean Application No. 10-2017-7014893, dated Sep. 3, 2018 (6 pages).
Notice of Allowance issued in corresponding Japanese Application No. 2017-150229 dated Nov. 28, 2017 (3 pages).
Notice of Allowance in counterpart Japanese Patent Application No. 2016-214849 dated Jul. 4, 2017 (3 pages).
Office Action in corresponding Japanese Patent Application No. 2016-214849 dated Feb. 14, 2017 (6 pages).
Office Action in corresponding Korean Patent Application No. 10-2017-7014893 dated Feb. 25, 2019 (3 pages).
Office Action issued in corresponding Chinese application No. CN201710160153.6 dated Jun. 4, 2019 (7 pages).

* cited by examiner

OPTICAL FIBER CUTTING SYSTEM

TECHNICAL FIELD

One or more embodiments of the present invention relate to an optical fiber cutting system.

Priority is claimed on Japanese Patent Application No. 2016-214849, filed on Nov. 2, 2016, the content of which is incorporated herein by reference.

BACKGROUND

When cutting an optical fiber (an optical fiber core), first, a blade member is brought into contact with the optical fiber to make an initial scratch on a surface of the optical fiber. Thereafter, the optical fiber is cut by press-bending a region in which the initial scratch is made in the optical fiber. The blade member is worn each time it makes the initial scratch on the optical fiber. Therefore, conventionally, it has been considered to change the region of the blade member which is to be in contact with the optical fiber (see Patent Documents 1 to 3, for example).

In Patent Document 1, a method is disclosed which rotates the blade member bit by bit each time a disk-shaped blade member (a scratching blade) makes the initial scratch on the optical fiber.

In Patent Document 2, a method is disclosed which analyzes an end face of the optical fiber after being cut by an image analyzer, and automatically changes the contact region of the blade member with respect to the optical fiber when cutting performance of a predetermined region of the blade member is determined to be degraded according to the analysis result.

In Patent Document 3, a configuration is disclosed in which an image analyzer that analyzes an end face of the optical fiber after being cut (before being connected) is provided in a fusion splicer that is configured to connect the optical fibers to each other. In this configuration, when the predetermined region of the blade member is determined to be worn down according to the analysis result of the image analyzer, an instruction to change the region of the blade member which is to be in contact with the optical fiber is transmitted to a cutter including the blade member.

PRIOR ART DOCUMENTS

Patent Documents

[Patent Document 1] Japanese Patent No. 2850910
[Patent Document 2] Japanese Unexamined Patent Application, First Publication No. H06-186436
[Patent Document 3] Japanese Patent No. 4383289

Since a blade member that is used to cut an optical fiber is expensive, all parts of the blade member making a scratch on the optical fiber may be used without waste. However, in the above-mentioned conventional configuration, a movement error of the blade member may occur when changing a position of the blade member. As a result, a part of the blade member is not used.

SUMMARY

One or more embodiments of the invention provide an optical fiber cutting system capable of using the blade member without waste.

An optical fiber cutting system according to one or more embodiments of the invention includes a pair of clamps disposed at an interval in a longitudinal direction of an optical fiber and configured to grasp the optical fiber, a disk-shaped blade member configured to move so as to pass between the pair of clamps, cause an outer circumferential edge to come into contact with the optical fiber, and thereby scratch a surface of the optical fiber, wherein a position of the outer circumferential edge which is to be in contact with the optical fiber is changeable, a pressing member configured to press-bend a scratched portion of the optical fiber and thereby cut the optical fiber; and an acquirer configured to acquire position information of the outer circumferential edge which is to be in contact with the optical fiber.

In one or more embodiments of the optical fiber cutting system described above, the acquirer may include an outer edge position measuring sensor configured to measure a rotation angle of the blade member as the position information to be acquired.

Also, in one or more embodiments of the optical fiber cutting system described above, the blade member is configured to move in a direction perpendicular to the longitudinal direction and a relative position between the optical fiber and the outer circumferential edge in a height direction perpendicular to a movement direction of the blade member and the longitudinal direction of the optical fiber may be changeable, and the acquirer may further acquire information on the relative position between the optical fiber and the outer circumferential edge in the height direction.

Further, in one or more embodiments of the optical fiber cutting system described above, the acquirer may further include a position measuring sensor configured to measure a position of the outer circumferential edge in the height direction as the relative position information.

Also, one or more embodiments of the optical fiber cutting system described above may further include a calculator configured to calculate maintenance information on the blade member according to the position information acquired by the acquirer.

In addition, one or more embodiments of the optical fiber cutting system described above may further include a storage configured to store at least one of the position information and the maintenance information.

Also, one or more embodiments of the optical fiber cutting system described above may further include a display configured to display at least one of the position information and the maintenance information.

Further, one or more embodiments of the optical fiber cutting system described above may further include a transmitter configured to transmit at least one of the position information and the maintenance information, from an optical fiber cutter to an external device which is separate from the optical fiber cutter, the optical fiber cutter including the pair of clamps, the blade member, the pressing member, and the acquirer.

Also, in one or more embodiments of the optical fiber cutting system described above, the calculator may be provided in the external device and the maintenance information calculated in the calculator of the external device may be transmitted to the optical fiber cutter and may be stored in a storage provided in the optical fiber cutter.

Further, in one or more embodiments of the optical fiber cutting system described above, the calculator may be provided in the external device and the maintenance information calculated in the calculator of the external device may be transmitted to the optical fiber cutter and may be displayed on a display provided in the optical fiber cutter.

Also, in one or more embodiments of the optical fiber cutting system described above, at least one of the position information and the maintenance information may be associated with connection data to be collected by a fusion splicer that is configured to connect the optical fibers to each other and may be stored in a storage provided in the external device.

Effects of the Invention

According to one or more embodiments of the invention, a position of an outer circumferential edge of a blade member with respect to an optical fiber can be accurately ascertained by acquiring position information of the outer circumferential edge of the blade member which is to be in contact with the optical fiber. Therefore, it is possible to use the blade member without waste.

DETAILED DESCRIPTION

[First Embodiment]

Hereinafter, a first embodiment of an optical fiber cutting system 1 according to the invention will be described with reference to FIGS. 1 to 6.

Figure 1:
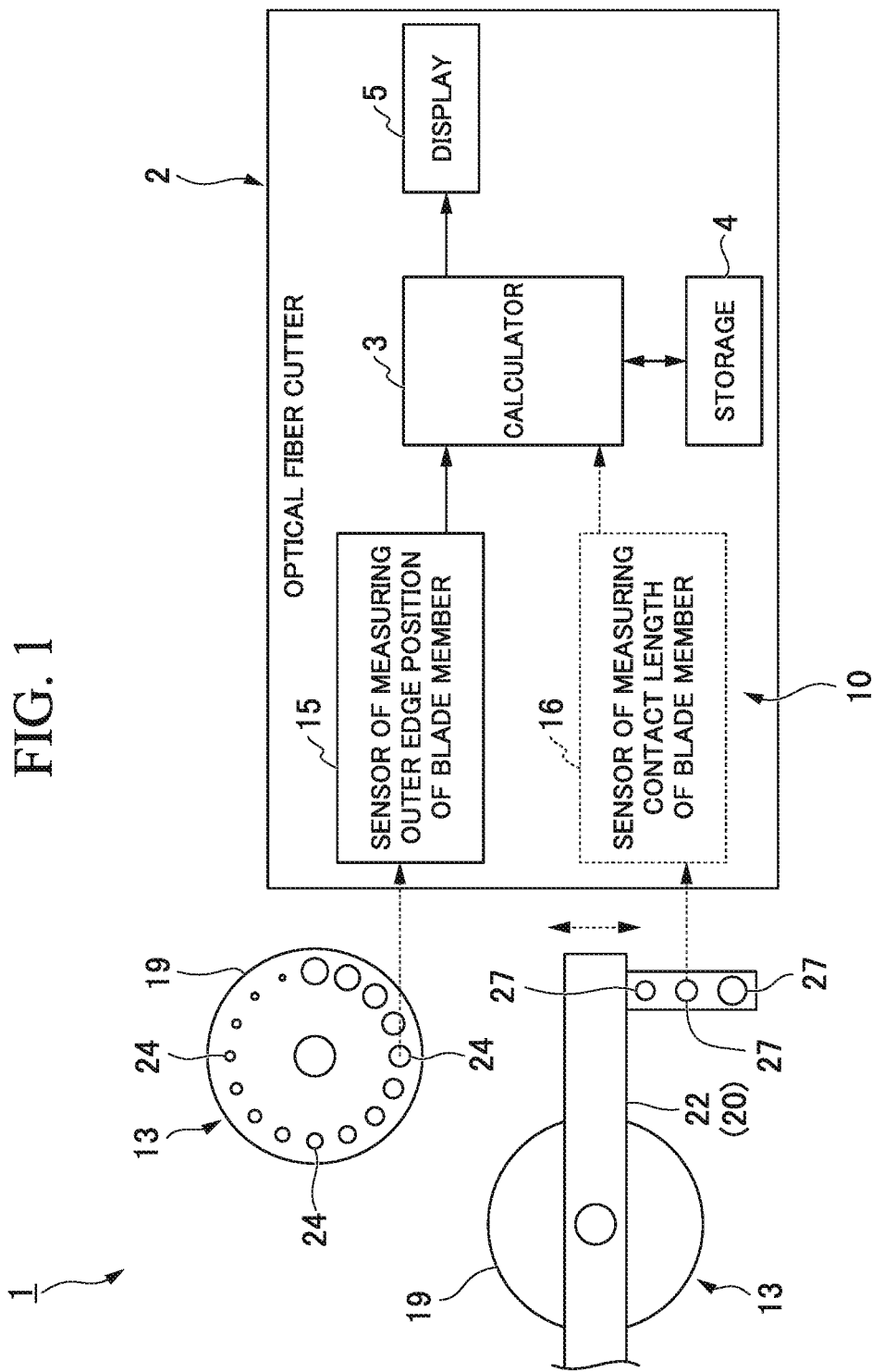
FIG. 1 is a block diagram showing an optical fiber cutting system according to a first embodiment of the invention.
Figure 2:
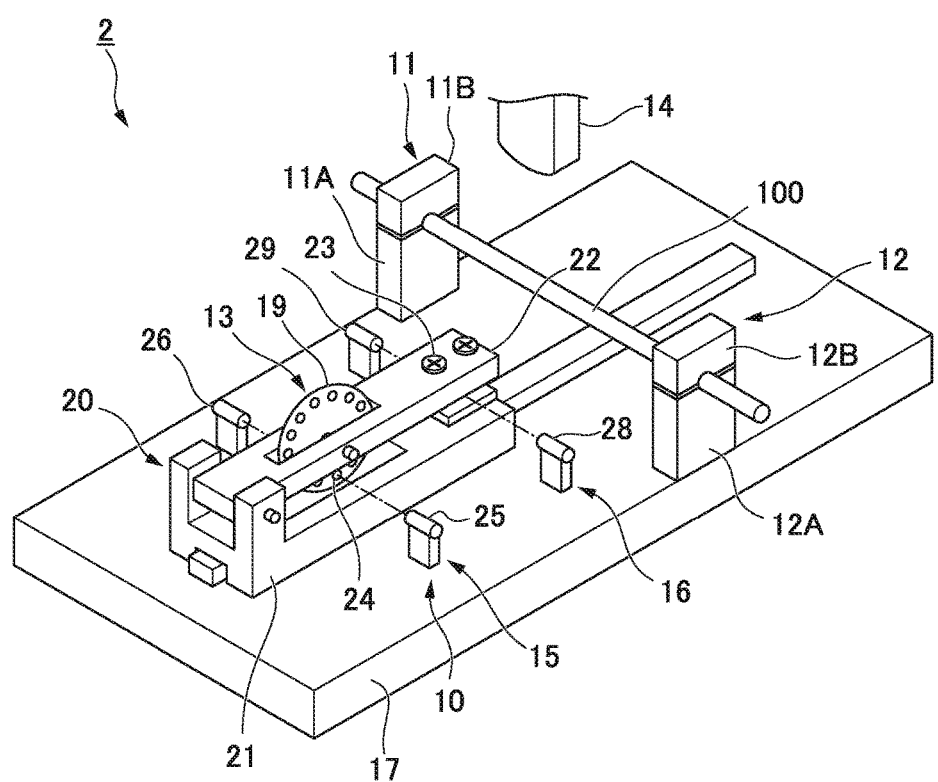
FIG. 2 is a perspective view showing a configuration example of an optical fiber cutter provided in the optical fiber cutting system of FIG. 1.

As shown in FIGS. 1 and 2, the optical fiber cutting system 1 of the embodiment includes an optical fiber cutter 2 having a blade member 13 that is used to cut (cleaving) an optical fiber 100 (an optical fiber core) and an acquirer 10 which acquires position information of the blade member 13 with respect to the optical fiber 100.

Also, the optical fiber cutting system 1 of the embodiment includes a calculator 3 configured to process the position information of the blade member 13, a storage 4, and a display 5.

The optical fiber cutter 2 includes a pair of clamps 11 and 12, the blade member 13, and a pressing member 14. The pair of clamps 11 and 12 and the blade member 13 are disposed on a base 17 of the optical fiber cutter 2. Although not particularly shown, the pressing member 14 is also disposed on the base 17 in the same manner.

The pair of clamps 11 and 12 are disposed at an interval in a longitudinal direction of the optical fiber 100 to grasp the optical fiber 100. The clamps 11 and 12 respectively include lower clamps 11A and 12A and upper clamps 11B and 12B which sandwich the optical fiber 100 in a vertical direction (in a vertical direction in FIG. 2). Elastic pads 18 (see FIGS. 5A to 5D and FIGS. 6A to 6D) such as rubber are provided at portions in which the lower clamps 11A and 12A and the upper clamps 11B and 12B face each other (portions at which the optical fiber 100 is sandwiched).

The blade member 13 is formed in a disc shape. The blade member 13 is disposed such that the plane of the disk is perpendicular to the longitudinal direction of the optical fiber 100 (an arrangement direction of the pair of clamps 11 and 12). The blade member 13 is movable between the pair of clamps 11 and 12 in a direction perpendicular to the longitudinal direction of the optical fiber 100 with respect to the pair of clamps 11 and 12 and the optical fiber 100 grasped thereby.

An outer circumferential edge 19 (a blade tip) of the blade member 13 comes into contact with the surface of the optical fiber 100 grasped by the pair of clamps 11 and 12 halfway through a movement path (during the course of the movement) and thus the blade member 13 scratches a surface of the optical fiber 100.

The blade member 13 is rotatable about an axis of the blade member 13 above the base 17.

Thus, a position of the outer circumferential edge 19 of the blade member 13 which comes into contact with the optical fiber 100 is changeable. Also, the blade member 13 is switchable between a non-rotatable state and a rotatable state by a holder such as a screw. Therefore, the position of the outer circumferential edge 19 of the blade member 13 which comes into contact with the optical fiber 100 can be appropriately held.

Also, in the optical fiber cutter 2 of the embodiment, a relative position between the optical fiber 100 and the outer circumferential edge 19 of the blade member 13 is changeable in a height direction (an upward direction in FIG. 2) perpendicular to the longitudinal direction of the optical fiber 100 and a movement direction of the blade member 13. Thus, it is possible to change pressure (contact pressure) pushing the outer circumferential edge 19 of the blade member 13 against a surface of the optical fiber 100 when the blade member 13 scratches the surface of the optical fiber 100.

In the optical fiber cutter 2 described in FIG. 2 as an example, the blade member 13 is rotatably provided about the axis of the blade member 13 with respect to a blade base 20 arranged to be movable in the movement direction of the blade member 13 described above on the base 17.

Also, in the optical fiber cutter 2 described in FIG. 2 as an example, a position (a height position) of the blade member 13 in the height direction described above is adjustable and a height position of the optical fiber 100 grasped by the pair of clamps 11 and 12 is fixed. Hereinafter, a mechanism of adjusting the height position of the blade member 13 will be specifically described.

In the optical fiber cutter 2 shown in FIG. 2 as an example, the blade base 20 includes a base 21 and a swinger 22 swingably connected to the base 21. A shaft (a connecting shaft) connecting the base 21 and the swinger 22 is parallel to the longitudinal direction of the optical fiber 100. The swinger 22 extends in a direction away from the connecting shaft. The blade member 13 is provided at an intermediate portion in an extending direction of the swinger 22. An adjustment screw 23 that adjusts a height position of a distal end of the swinger 22 with respect to the base 21 is attached to the distal end in the extending direction of the swinger 22. Therefore, the height position of the blade member 13 is adjustable.

In the embodiment, the rotation of the blade member 13 and the adjustment of the height position of the blade member 13 are manually adjusted by an operator handling the optical fiber cutter 2.

In the optical fiber cutter 2 including the pair of clamps 11 and 12 and the blade member 13 described above, when scratching the surface of the optical fiber 100 (making an initial scratch on the surface of the optical fiber 100), the movement of the blade member 13 in a direction perpendicular to the optical fiber 100 grasped by the pair of clamps 11 and 12 causes the outer circumferential edge 19 of the blade member 13 to be pushed against the surface of the optical fiber 100 as shown in FIGS. 5B to 5D and FIGS. 6B to 6D.

Figure 5A:
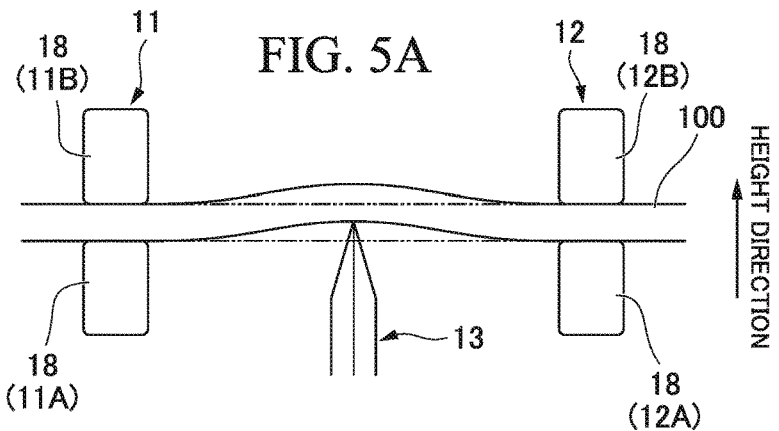
FIG. 5A is an explanatory view showing a process of scratching a surface of an optical fiber by a blade member in the optical fiber cutter of FIG. 2.
Figure 5B:
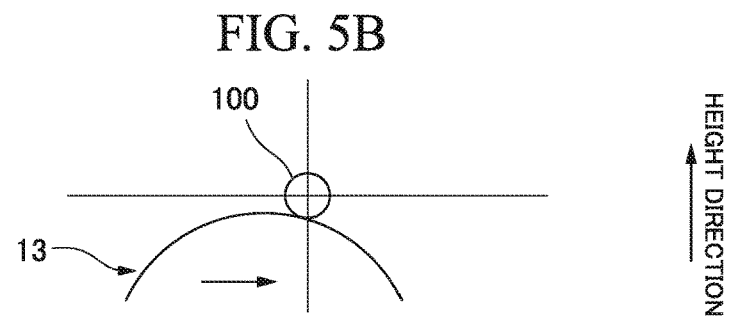
FIG. 5B is an explanatory view showing a process of scratching a surface of an optical fiber by a blade member in the optical fiber cutter of FIG. 2.
Figure 5C:
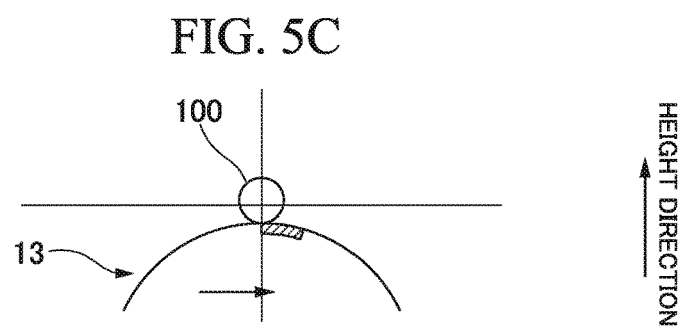
FIG. 5C is an explanatory view showing a process of scratching a surface of an optical fiber by a blade member in the optical fiber cutter of FIG. 2.
Figure 6A:
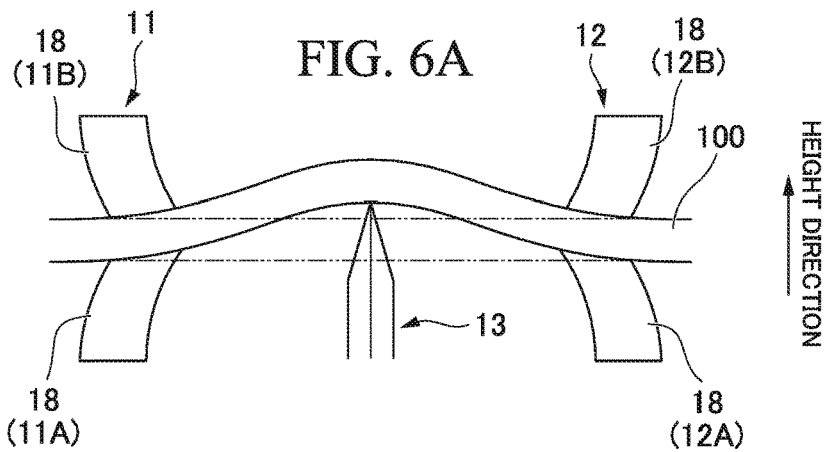
FIG. 6A is an explanatory view showing a process of scratching an optical fiber by a blade member when a relative position between the optical fiber and the blade member is closer than that in FIG. 5.
Figure 6B:
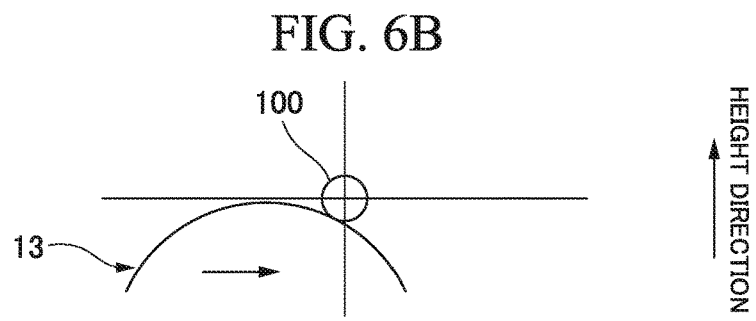
FIG. 6B is an explanatory view showing a process of scratching an optical fiber by a blade member when a relative position between the optical fiber and the blade member is closer than that in FIG. 5.
Figure 6C:
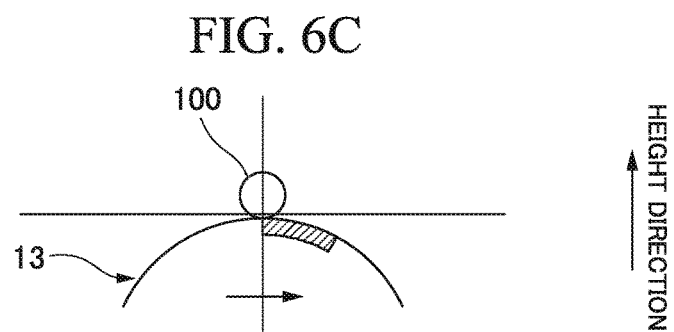
FIG. 6C is an explanatory view showing a process of scratching an optical fiber by a blade member when a relative position between the optical fiber and the blade member is closer than that in FIG. 5.

At this time, the optical fiber 100 positioned between the pair of clamps 11 and 12 is bent due to the blade member 13 pushing thereagainst as shown in FIGS. 5A and 6A. Thus, a predetermined length in a circumferential direction of the outer circumferential edge 19 of the blade member 13 comes into contact with the surface of the optical fiber 100. In the following description, this predetermined length is referred to as a "contact length" of the blade member 13 with respect to the optical fiber 100.

Figure 5D:
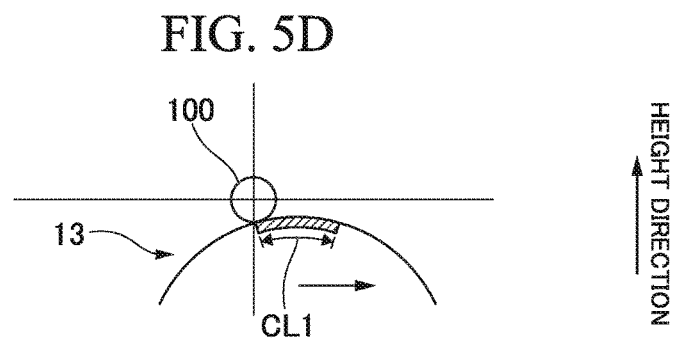
FIG. 5D is an explanatory view showing a process of scratching a surface of an optical fiber by a blade member in the optical fiber cutter of FIG. 2.
Figure 6D:
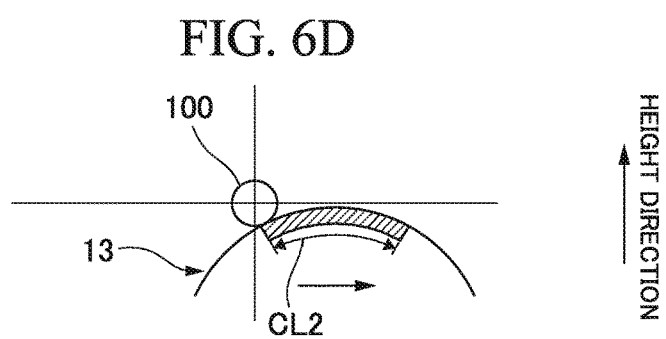
FIG. 6D is an explanatory view showing a process of scratching an optical fiber by a blade member when a relative position between the optical fiber and the blade member is closer than that in FIG. 5.

The contact length of the blade member 13 with respect to the optical fiber 100 is indicated by reference signs CL1 and CL2 in FIGS. 5D and 6D.

The contact length of the blade member 13 changes according to the relative position between the optical fiber 100 and the blade member 13 in the height direction. For example, as shown in FIG. 5, when an upper end of the blade member 13 is positioned, with respect to the optical fiber 100, relatively lower in the height direction, bending of the optical fiber 100 is small (the contact pressure is low) and a contact length CL1 of the blade member 13 is short. On the other hand, as shown in FIG. 6, when the upper end of the blade member 13 is positioned higher in the height direction compared to the case of FIG. 5, bending of the optical fiber 100 is large (the contact pressure is high) and the contact length CL2 of the blade member 13 is long. When the cutting performance of the outer circumferential edge 19 of the blade member 13 is assumed to be the same, the longer the contact length of the blade member 13 is, the greater the extent to which the optical fiber 100 is scratched.

The pressing member 14 shown in FIG. 2 press-bends a scratched portion of the optical fiber 100 and thereby cuts the optical fiber 100 after the surface of the optical fiber 100 is scratched by the blade member 13.

In the above-described optical fiber cutter 2, the blade member 13 is rotatable. Therefore, it is possible to repeat the performance of scratching the optical fiber 100 every time with the predetermined (identical) outer circumferential edge 19 (a portion of the outer circumferential edge 19 in the circumferential direction) of the blade member 13 and a predetermined (identical) contact pressure. It is also possible to repeat the performance of scratching the optical fiber 100 every time not only with the outer circumferential edge 19 fixed at a predetermined position but also with changing the position of the outer circumferential edge 19, with the predetermined (identical) contact pressure. It is also possible to repeat the performance of scratching the optical fiber 100 every time not only with the contact pressure set to a predetermined pressure but also with changing the contact pressure, while the position of the outer circumferential edge 19 is fixed.

When abrasion of the predetermined outer circumferential edge 19 due to the scratching on the optical fiber 100 described as above (including degradation such as abrasion of or defects in the blade tip of the blade member 13 over time) causes the cutting performance for cutting the optical fiber 100 to be degraded, the blade member 13 is rotated to change the position of the outer circumferential edge 19 of the blade member 13 which comes into contact with the optical fiber 100. Specifically, the blade member 13 is rotated so that another outer circumferential edge 19 adjacent to the predetermined outer circumferential edge 19 comes into contact with the optical fiber 100 at the time of scratching. Therefore, the above-described cutting performance is restored.

Also, in the optical fiber cutter 2 described above, the relative position between the optical fiber 100 and the blade member 13 in the height direction is changeable. Therefore, it is possible to repeat the performance of scratching the optical fiber 100 every time with the predetermined (identical) outer circumferential edge 19 of the blade member 13 and a predetermined (identical) contact pressure. It is also possible to repeat the performance of scratching the optical fiber 100 every time not only with the outer circumferential edge 19 fixed at a predetermined position but also with changing the position of the outer circumferential edge 19, with the predetermined (identical) contact pressure. It is also possible to repeat the performance of scratching the optical fiber 100 every time not only with the contact pressure set to a predetermined pressure but also with changing the contact pressure, while the position of the outer circumferential edge 19 is fixed.

As described above, when the abrasion of the predetermined outer circumferential edge 19 due to the scratching on the optical fiber 100 causes the cutting performance for cutting the optical fiber 100 to be degraded, the relative position between the optical fiber 100 and the blade member 13 in the height direction is changed so that the contact pressure increases (so that the contact length increases). Therefore, the above-described cutting performance is restored.

In the above description, whether or not the cutting performance has degraded is determined when an end face condition of the optical fiber 100 is checked by the operator after cutting the optical fiber 100, for example.

As shown in FIGS. 1 and 2, the acquirer 10 acquires position information of the outer circumferential edge 19 of the blade member 13 which is to be in contact with the optical fiber 100.

The acquirer 10 of the embodiment includes an outer edge position measuring sensor 15 configured to measure a rotation angle (a rotational position) of the blade member 13 as the position information of the outer circumferential edge 19 of the blade member 13 with respect to the optical fiber 100. In other words, the outer edge position measuring sensor 15 measures the position of the outer circumferential edge 19 of the blade member 13 which comes into contact with the optical fiber 100. In the embodiment, the outer edge position measuring sensor 15 is provided in the optical fiber cutter 2.

The outer edge position measuring sensor 15 may be configured to continuously measure the rotation angle of the blade member 13, for example, but the rotation angle is discretely measured in the embodiment. The number of rotation angles of the blade member 13 (the positions of the outer circumferential edges 19) to be measured may be appropriately set corresponding to a diameter dimension of the blade member 13, but is set to 16 in this embodiment. That is, in the embodiment, the number of positions of the outer circumferential edge 19 of the blade member 13, which are arranged in the circumferential direction of the blade member 13 and can be used to cut the optical fiber 100, is set to 16 positions.

As shown in FIGS. 1 and 2, the outer edge position measuring sensor 15 is configured to detect one of a plurality (16) of markers 24 arranged at regular intervals in the circumferential direction on the outer edge of the blade member 13 and is configured to measure the rotation angle of the blade member 13, for example.

The marker 24 may be detected by any means such as magnetism, but is detected using an optical method in the embodiment. The marker 24 of this type may be character information (numbers from 1 to 16, for example) that is recognizable by an image acquisition device, for example, and may be a code that indicates a position in a light and dark manner like a three-dimensional bar code.

The outer edge position measuring sensor 15 of this embodiment is an optical sensor having a light emitter 25 and a light receiver 26. Therefore, the marker 24 may be a reflection plate which reflects light, for example, but in the embodiment, is a through hole which allows light from the light emitter 25 to pass through the blade member 13 in an axial direction thereof. The amount of the light reaching the light receiver 26 through the through hole can be different by making the sizes of a plurality of through holes different from each other. Therefore, the rotation angle of the blade member 13 can be measured.

The rotation angle (a measured value) of the blade member 13 measured by the outer edge position measuring sensor 15 is output from the outer edge position measuring sensor 15 as an electric signal, for example.

Also, the acquirer 10 of the embodiment acquires the relative position information between the optical fiber 100 and the outer circumferential edge 19 of the blade member 13 in the height direction. Specifically, the acquirer 10 of the embodiment includes a contact length measuring sensor (a position measuring sensor) 16 which measures the position of the outer circumferential edge 19 of the blade member 13 (the height position of the blade member 13) in the height direction as the above-described relative position information. In the embodiment, the contact length measuring sensor 16 is provided in the optical fiber cutter 2.

The contact length measuring sensor 16 may continuously measure the height position of the blade member 13 but in the embodiment, it is measured discretely. The number of the height positions of the blade member 13 to be measured may be arbitrary, but in the embodiment, it is set to be three types of "low", "middle", and "high". That is, in the embodiment, the number of height positions of the blade member 13 available to be used to cut the optical fiber 100 is set to be three at the same position of the outer circumferential edge 19.

Therefore, in the embodiment, the total number of positions of the blade member 13 that can be used to cut the optical fiber 100 becomes 48 positions when the 16 positions of the outer circumferential edge 19 in the circumferential direction of the blade member 13 is multiplied by the three positions in the height positions of the blade member 13.

As shown in FIG. 1, for example, the contact length measuring sensor 16 detects one of a plurality (three) of markers 27 arranged at intervals in a swinging direction (a height direction) of the swinger 22 at the distal end of the swinger 22 of the blade base 20 to measure the height position of the blade member 13.

A method of detecting the marker 27 is the same as that of the outer edge position measuring sensor 15. That is, the contact length measuring sensor 16 of the embodiment is an optical sensor having a light emitter 28 and a light receiver 29 (see FIG. 2), and the marker 27 is a through hole through which light from the light emitter 28 is allowed to pass. Also, it is possible to measure the height position of the blade member 13 by making the sizes of a plurality of the marker 27 different from each other.

The height position (a measured value) of the blade member 13 measured by the contact length measuring sensor 16 is output from the outer edge position measuring sensor 15 as an electric signal, for example.

The above-described outer edge position measuring sensor 15 and the contact length measuring sensor 16 are provided in the optical fiber cutter 2.

As shown in FIG. 2 as an example, the outer edge position measuring sensor 15 and the contact length measuring sensor 16 are disposed on the base 17 to acquire the position information of the blade member 13 in a state in which the outer circumferential edge 19 of the blade member 13 is positioned spaced apart, in the movement direction of the blade member 13, from a position in which it comes into contact with the optical fiber 100 (a standby position, for example). In this case, an arrangement of electric wiring (not shown in figure) extending from the outer edge position measuring sensor 15 and the contact length measuring sensor 16 can be easily set.

Also, the outer edge position measuring sensor 15 and the contact length measuring sensor 16 may be disposed on the base 21 of the blade base 20, for example. In this case, the position information of the blade member 13 can be acquired at an arbitrary position in the movement direction of the blade member 13.

The outer edge position measuring sensor 15 and the contact length measuring sensor 16 may be configured such that the light emitters 25 and 28 and the light receivers 26 and 29 are separately provided as shown in FIG. 2 as an example but may also be provided as a photo sensor in which the light emitters 25 and 28 and the light receivers 26 and 29 are integrally provided.

The calculator 3 shown in FIG. 1 calculates maintenance information on the blade member 13 according to the position information acquired in the outer edge position measuring sensor 15 and the contact length measuring sensor 16.

For example, when the cutting performance for cutting the optical fiber 100 is degraded due to the abrasion of the predetermined outer circumferential edge 19 of the blade member 13, information indicating at least one of a next position of the outer circumferential edge 19 to be used to cut a next optical fiber 100 (another outer circumferential edge 19 different from the predetermined outer circumferential edge 19) and the height position of the blade member 13 (hereinafter, referred to as "Next destination position of the blade member 13"), that is, information for restoring the cutting performance may be included in the maintenance information.

Information indicating a correct order of use of the plurality of positions (48 positions) of the blade member 13 (hereinafter, referred to as "Correct order of use of the blade member 13") used to cut the optical fiber 100 is used in calculating the "Next destination position of the blade member 13". This information is stored in advance in the storage 4 to be described below.

In the embodiment, the information of the "Correct order of use of the blade member 13" is set to include the following procedures A to E in order.

Procedure A: The position of the blade member 13 used for the first time (initial position) for cutting the optical fiber 100 is set such that the height position of the blade member 13 is "low" and the position of the outer circumferential edge 19 in the circumferential direction of the blade member 13 is "No. 1" ("Height position of blade (Blade height): low, Position of the outer circumferential edge 19 of the blade member 13 (Blade angle): No. 1"). The position of the outer circumferential edge 19 in the circumferential direction of the blade member 13 is assumed to be numbered as "No. 1"→"No. 2", . . . "No. 16" in the circumferential direction of the blade member 13.

Procedure B: Based on the above description, each time the outer circumferential edge 19 of the predetermined number of the blade member 13 which is to be in contact with the optical fiber 100 is worn down, the blade member 13 is rotated in such a way that the position of the outer circumferential edge 19 in the circumferential direction of the blade member 13 is changed in a sequence of "No. 1"→"No. 2"→"No. 3"→ . . . →"No. 15"→"No. 16".

Procedure C: When the blade member 13 completes a full rotation and returns to "No. 1", the height position of the blade member 13 is changed from "low" to "middle". That is, in the blade member 13, the position of "Blade height: middle, Blade angle: No. 1" is used after using the position of "Blade height: low, Blade angle: No. 16".

Procedure D: With the blade member 13 held at the height position of "middle", as in Procedure B described above, the position of the outer circumferential edge 19 in the circumferential direction of the blade member 13 is changed in the sequence of "No. 1"→"No. 2"→"No. 3"→ . . . →"No. 15"→"No. 16".

Procedure E: When the blade member 13 completes a full rotation and returns to "No. 1", as in Procedure C described above, the position of the blade member 13 is changed from "Blade height: middle, Blade angle: No. 16" to "Blade height: high, Blade angle: No. 1".

Procedure F: With the blade member 13 held at the height position of "high", as in Procedure B described above, the position of the outer circumferential edge 19 in the circumferential direction of the blade member 13 is changed in the sequence of "No. 1"→"No. 2"→"No. 3"→ . . . →"No. 15"→"No. 16" and then the use of the blade member 13 itself is terminated at a stage (in which cutting performance is deteriorated) when the use at "Blade height: high, Blade angle: No. 16" is completed.

Therefore, in the embodiment, when the position of the blade member 13 currently used is "Blade height: middle, Blade angle: No. 16", the "Next destination position of the blade member 13" calculated in the calculator 3 becomes "Blade height: high, Blade angle: No. 1" according to the information of "Correct order of use of the blade member 13" described above.

The maintenance information may also include information indicating a degree of consumption of the blade member 13, for example. The degree of consumption of the blade member 13 refers to a ratio, for example, in which the total number of positions (48 positions) of the blade member 13 that can be used to cut the optical fiber 100 is set as a denominator and the current number of positions of the blade member 13 whose use for cutting the optical fiber 100 has been completed is set as a numerator. When the number of positions of the blade member 13 whose use for cutting the optical fiber 100 has been completed is 36 positions, the degree of consumption of the blade member 13 is 75%, for example.

The maintenance information may also include information indicating a remaining life of the blade member 13, for example. The remaining life of the blade member 13 refers to a ratio, for example, in which the total number of positions (48 positions) of the blade member 13 that can be used to cut the optical fiber 100 is set as a denominator and the current number of positions of the blade member 13 whose use for cutting the optical fiber 100 has not been completed is set as a numerator. When the number of positions of the blade member 13 whose use for cutting the optical fiber 100 has not been completed is 12 positions, the remaining life of the blade member 13 is 25%, for example.

The maintenance information may also include information indicating an estimated replacement time (42 days from now, for example) of the blade member 13, for example. In this case, the information indicating the estimated replacement time of the blade member 13 may be calculated based on an estimated value of the number of positions of the blade member 13 used per day, for example.

The storage 4 stores the position information of the blade member 13 with respect to the optical fiber 100 and the above-described maintenance information. Also, the storage 4 stores the above-described information such as "Correct order of use of the blade member 13" and the total number of positions (48 positions) of the blade member 13 that can be used to cut the optical fiber 100. The calculator 3 may appropriately read out various types of information stored in the storage 4.

Figure 3:
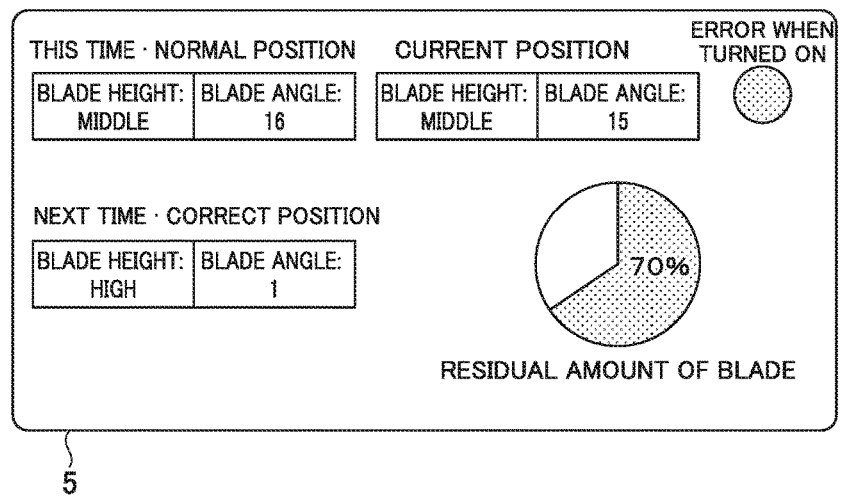
FIG. 3 is a view showing a first display example of a display provided in the optical fiber cutting system of FIG. 1.
Figure 4:
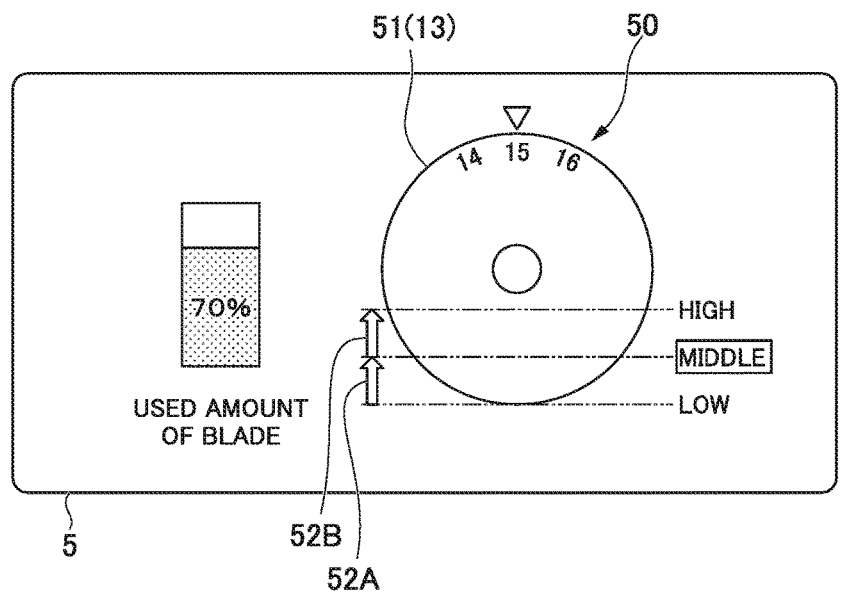
FIG. 4 is a view showing a second display example of the display provided in the optical fiber cutting system of FIG. 1.

The display 5 displays the position information and the maintenance information of the blade member 13 as shown in FIGS. 3 and 4, for example. Hereinafter, an example of information displayed on the display 5 will be described in detail with reference to FIGS. 3 and 4.

On the display 5 (a display screen) shown in FIG. 3 as an example, current position information (the information displayed at "Current position" in FIG. 3) of the blade member 13 is displayed. The information of the "current position" is the position information of the blade member 13 acquired by the outer edge position measuring sensor 15 and the contact length measuring sensor 16.

The display 5 of FIG. 3 also displays information of the current normal position of the blade member 13 (the information displayed at "This time·Normal Position" in FIG. 3)

calculated by the calculator 3 according to the information of the "Correct order of use of the blade member 13" stored in the storage 4. For example, in a state immediately after the unused blade member 13 is mounted, "Blade height: low, Blade angle: 1 (degree)" is displayed at the "This time·Normal Position".

The display 5 of FIG. 3 also displays the information of the "Next destination position of the blade member 13" (the information displayed at "Next time·Normal Position" in FIG. 3) calculated by the calculator 3. The information at the "Next time·Normal Position" is the information calculated by the calculator 3 according to the information of the "This time·Normal Position" and the information of the "Correct order of use of the blade member 13" which is stored in the storage. When "Blade height: middle, Blade angle: 16)" is displayed as information of the "This time·Normal Position", "Blade height: high, Blade angle: 1" is displayed as information of the "Next time·Normal Position", for example.

When the information of the "Next time·Normal Position" is displayed on the display 5, the operator handling the optical fiber cutter 2 may rotate the blade member 13 or adjust the height position of the blade member 13 in accordance with the displayed information of the "Next time·Normal Position". Therefore, it is possible to appropriately reduce the occurrence of a movement error of the blade member 13 when the operator changes the position of the blade member 13.

Three types of information described above including the "Current position", the "This time·Normal Position", and the "Next time·Normal Position" may be simultaneously displayed as shown in FIG. 3 but may also be displayed in sequence by the operator manipulating an operation button (not shown in figure) for the display 5 or the like.

The display 5 of FIG. 3 also displays information for warning the operator that a movement error has occurred (information displayed at "Error when turned on" in FIG. 3) when the position change of the blade member 13 by the operator causes a movement error of the blade member 13, that is, when the position change of the blade member 13 by the operator does not follow the "Correct order of use of the blade member 13".

The determination of the movement error of the blade member 13 is carried out by the calculator 3 comparing the information of the "Current position" with the information of the "This time·Normal Position", for example. In the example of FIG. 3, the information of the "Error when turned on" is displayed because "Current position" is displayed as "Blade height: middle, Blade angle: 15)", which is different from "Blade height: middle, Blade angle: 16)" being displayed at the "This time·Normal Position".

As described above, since the operator is warned (notified) of the movement error of the blade member 13, the operator can correct the position of the blade member 13. Therefore, it is possible to further reduce the occurrence of a movement error of the blade member 13.

On the display 5 of FIG. 3, information on the remaining life of the blade member 13 (information displayed as "Residual amount of blade" in FIG. 3) calculated by the calculator 3 is also displayed. The information of the "Residual amount of blade" may be displayed only by numerals, for example, but it may be displayed in a graphic form (a visual representation) such as a circular graph or bar graph as in the shown example so that the operator can easily recognize it. For example, when the residual amount of blade is 0%, information for notifying the operator that the blade member 13 may be replaced may be displayed on the display 5 of FIG. 3.

On the display 5 (display screen) shown in FIG. 4 as an example, the current position information of the blade member 13 (current position information of the blade member 13 indicated by reference sign 50 in FIG. 4) is displayed. The information itself displayed in FIG. 4 is the same as the information of the "Current position" in FIG. 3. However, on the display 5 of FIG. 4, the current position information 50 of the blade member 13 is displayed in a graphic form.

Specifically, the current position information 50 of the blade member 13 includes a circular shape 51 shaped like the blade member 13, a plurality of numbers displayed side by side in an outer edge of the circular shape 51 to indicate the position of the outer circumferential edge 19 in the circumferential direction of the blade member 13, and a triangle-shaped arrow indicating the number of the outer circumferential edge 19 of the blade member 13 which is currently in contact with the optical fiber 100 among the plurality of numbers.

On the display 5 of FIG. 4, only the number of the outer circumferential edge 19 of the blade member 13 which is to be in contact with the optical fiber 100 ("15" in FIG. 4) and two numbers adjacent to this number ("14" and "16" in FIG. 4) are displayed among the plurality of numbers for indicating the position of the outer circumferential edge 19 in the circumferential direction of the blade member 13, but the invention is not limited thereto.

The current position information 50 of the blade member 13 also includes character information and lines (gradations) indicating three height positions of the blade member 13 ("low", "middle", and "high"). A line indicating the height position of the blade member 13 is displayed to correspond to the circular shape 51 (the blade member 13). Specifically, the line indicating "low" in which the height position of the blade member 13 is at the lowest is displayed to correspond to an outer circumferential edge of the circular shape 51, and the line indicating "middle" in which the height position of the blade member 13 is in the middle or so and the line indicating "high" in which the height position is at the highest are displayed on a radial inner side of the circular shape 51 sequentially from the line indicating "low".

The current position information 50 of the blade member 13 also includes a "□ (square)" which surrounds the character information indicating the current height position of the blade member 13. On the display 5 of FIG. 4, the character information of "middle" is surrounded by the "□", which indicates current height position of the blade member 13 is "middle".

When the current position information 50 of the blade member 13 is displayed in a graphic form as described above, the operator can easily ascertain the current position of the blade member 13.

The current position information 50 of the blade member 13 shown in FIG. 4 as an example also includes arrows 52A and 52B indicating a direction (a correct direction) to change the height position of the blade member 13. Since the arrows 52A and 52B are displayed, a change to a wrong direction (from "middle" to "low", for example) can be reduced when the operator changes the height position of the blade member 13.

On the display 5 of FIG. 4, the current normal position information of the blade member 13 (information corresponding to the "This time·Normal Position" in FIG. 3) and the information of the "Next destination position of the blade member 13" (information corresponding to the "Next time·Normal Position" in FIG. 3) may be displayed in a graphic form similar to the case of the current position information 50 of the blade member 13 described above. Also, the three types of information by graphic display may be simultaneously displayed on the display 5 or may be displayed in sequence by the operator manipulating the operation button (not shown in figure) for the display 5 or the like.

Also, on the display 5 of FIG. 4, information on the degree of consumption of the blade member 13 ("Used amount of blade" in FIG. 4) calculated by the calculator 3 is displayed. The information of the "Used amount of blade" may be displayed only by numerals, for example, but it may be displayed in a graphic form such as a bar graph or circular graph as in the shown example so that the operator can easily recognize it. On the display 5 of FIG. 4, information for notifying the operator that the blade member 13 may be replaced may also be displayed when the used amount of the blade is 100%, for example.

A method of displaying various types of information (a numerical display, a graphic display, or the like) being displayed on the display 5 is not limited to those shown in FIGS. 3 and 4 or the like as an example, and may be arbitrary.

As described above, according to the optical fiber cutting system 1 of the embodiment, since the position information of the outer circumferential edge 19 of the blade member 13 which is to be in contact with the optical fiber 100 is acquired by the acquirer 10, the position of the outer circumferential edge 19 of the blade member 13 with respect to the optical fiber 100 can be accurately ascertained. Therefore, the occurrence of a movement error of the blade member 13 due to a human error of the operator can be appropriately reduced. As a result, it is possible to use the blade member 13 without waste.

Particularly, in the optical fiber cutting system 1 of the embodiment, the acquirer 10 includes the outer edge position measuring sensor 15 configured to measure the rotation angle of the blade member 13 as the position information of the outer circumferential edge 19 of the blade member 13. Therefore, the rotation angle of the blade member 13 (the position of the outer circumferential edge 19 of the blade member 13 which is to be in contact with the optical fiber 100) can be accurately ascertained.

Also, in the optical fiber cutting system 1 of the embodiment, the acquirer 10 acquires the relative position between the optical fiber 100 and the outer circumferential edge 19 of the blade member 13 in the height direction. Particularly, the acquirer 10 includes the contact length measuring sensor 16 configured to measure the position of the outer circumferential edge 19 of the blade member 13 in the height direction as information on the relative position. Therefore, the relative position between the optical fiber 100 and the blade member 13 in the height direction (the height position of the blade member 13) can be accurately ascertained.

Also, according to the optical fiber cutting system 1 of the embodiment, since the calculator 3, the storage 4, and the display 5 are provided in addition to the acquirer 10 configured to acquire the position information of the outer circumferential edge 19 of the blade member 13 with respect to the optical fiber 100, the operator can also be notified of the "Next destination position of the blade member 13". Therefore, it is possible to appropriately reduce the occurrence of a movement error of the blade member 13 due to the operator.

Also, even when a movement error of the blade member 13 occurs due to the operator, it is also possible to notify (warn) the operator of an indication of the movement error. Therefore, it is possible to further reduce the occurrence of a movement error of the blade member 13 due to the operator.

Also, according to the optical fiber cutting system 1 of the embodiment, since the acquirer 10, the calculator 3, the storage 4, and the display 5 are provided, the operator can also be notified of the maintenance information of the blade member 13 such as the degree of consumption, the remaining life, the estimated replacement time, and replacement instructions. Therefore, it is possible to appropriately prepare for the replacement of the blade member 13. For example, an unused blade member 13 can be prepared in advance when the degree of consumption of the blade member 13 is close to 100% (the remaining life is close to 0%) or when it nears the expected replacement time of the blade member 13. In order words, it is not necessary to always carry the unused blade member 13 and handling of the optical fiber cutter 2 is facilitated.

Also, according to the optical fiber cutting system 1 of the embodiment, the calculator 3 configured to process the position information of the blade member 13 acquired by the acquirer 10 or the maintenance information calculated according thereto, the storage 4, and the display 5 are provided in the optical fiber cutter 2. Therefore, a movement of the operator (a movement of a visual line, for example) can be minimized compared with the case in which the calculator 3, the storage 4, and the display 5 are provided separately from the optical fiber cutter 2. That is, the operator can easily handle the optical fiber cutting system 1.

[Second Embodiment]

Next, a second embodiment of the invention will be described mainly focusing on differences from the first embodiment with reference to FIG. 7. Also, components common to the first embodiment will be denoted by the same reference signs and a description thereof will be omitted.

Figure 7:
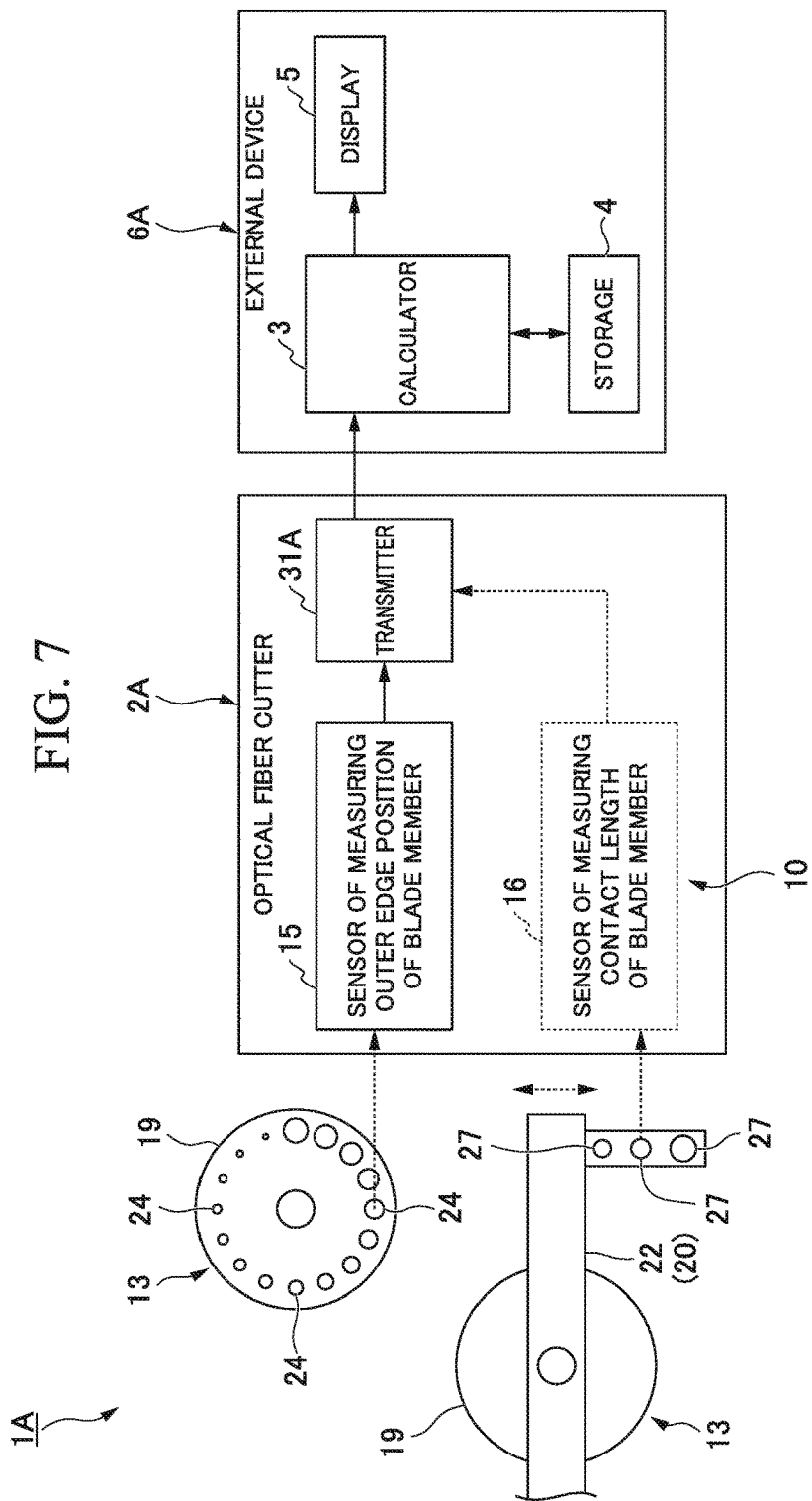
FIG. 7 is a block diagram showing an optical fiber cutting system according to a second embodiment of the invention.

As shown in FIG. 7, similar to the first embodiment, an optical fiber cutting system 1A of the embodiment includes an optical fiber cutter 2A, an outer edge position measuring sensor 15, a contact length measuring sensor 16, a calculator 3, a storage 4, and a display 5. A configuration of the optical fiber cutter 2A may be the same as that of the optical fiber cutter 2 of the first embodiment. The outer edge position measuring sensor 15 and the contact length measuring sensor 16 are provided in the optical fiber cutter 2A as in the first embodiment. Also, the functions of the calculator 3, the storage 4, and the display 5 are the same as those of the first embodiment.

However, in the optical fiber cutting system 1A of the embodiment, position information of a blade member 13 (a rotation angle of the blade member 13 and a height position of the blade member 13) measured by the outer edge position measuring sensor 15 and the contact length measuring sensor 16 is transmitted to an external device 6A which is separate from the optical fiber cutter 2A. That is, the optical fiber cutter 2A of the embodiment includes a transmitter 31A configured to transmit the position information of the blade member 13 output from the outer edge position measuring sensor 15 and the contact length measuring sensor 16 to the external device 6A.

The external device 6A may be, for example, a fusion splicer that is configured to connect the optical fibers 100 (optical fiber cores) to each other or may be an arbitrary device such as a mobile phone, a personal computer, or a cloud data server which can process the position information of the blade member 13.

When the external device 6A is the fusion splicer, one optical fiber 100 cut in the optical fiber cutter 2A may be connected to another optical fiber 100 different from said one optical fiber 100, for example. The other optical fiber 100 may be an optical fiber 100 cut separately from said one optical fiber 100 in the optical fiber cutter 2A, but the invention is not limited thereto.

The external device 6A includes a receiver (not shown in figure) which receives the position information of the blade member 13 transmitted from the optical fiber cutter 2A. A communication line transmitting the information from the optical fiber cutter 2A to the external device 6A may be wireless or wired line.

Also, in the optical fiber cutting system 1A of the embodiment, the calculator 3, the storage 4, and the display 5 are provided in the above-described external device 6A. Therefore, the calculation, storage, and display of the maintenance information or the like based on the position information of the blade member 13 are performed by the external device 6A.

Also, in the above-described fusion splicer, connection data of the optical fiber 100 may be collected, for example. For example, the connection data includes information such as an end face condition of the optical fiber 100 (an end face condition of the optical fiber 100 after being cut in the optical fiber cutter 2A) or an estimated connection loss of the optical fiber 100 (a connection loss of the optical fiber 100 estimated from the end face condition of the optical fiber 100) which is acquired by an image processing device before the optical fibers 100 are connected to each other in the fusion splicer.

In this case, the position information or the maintenance information of the blade member 13 associated with the above-described connection data may be stored in the storage 4 of the external device 6A. The external device 6A including the storage 4 may be the fusion splicer, for example, but the invention is not limited thereto. When the external device 6A including the storage 4 is separate from the fusion splicer, the above-described connection data may be transmitted from the fusion splicer to the external device 6A through a wireless or wired line.

The optical fiber cutting system 1A of the embodiment achieves the same effect as the first embodiment.

In addition, according to the optical fiber cutting system 1A of the embodiment, the calculator 3, the storage 4, and the display 5 are provided in the above-described external device 6A. Therefore, it is possible to reduce the size and cost of the optical fiber cutter 2A compared to the optical fiber cutting system 1A of the first embodiment. Also, since the optical fiber cutter 2A is reduced in size, the optical fiber cutter 2A is easily carried and it is particularly effective in the outdoor use of the optical fiber cutter 2A.

Also, in the optical fiber cutting system 1A of the embodiment, when the position information or the maintenance information of the blade member 13 is associated with the connection data to be collected in the fusion splicer and is stored in the storage 4 of the external device 6A, the following effect is achieved, for example.

According to the information in which the position information or the maintenance information of the blade member 13 is associated with the connection data, it is possible to calculate valid data for handling the blade member 13 in the calculator 3 or display it on the display 5. As valid data includes, for example, a timing at which the position of the blade member 13 with respect to the optical fiber 100 is to be changed, a timing at which the blade member 13 (a remaining life of the blade member 13) should be replaced, or the like. It is also possible to accurately calculate these timings.

[Third Embodiment]

Next, a third embodiment of the invention will be described mainly focusing on differences from the first and second embodiments with reference to FIG. 8. Also, components common to the first and second embodiment will be denoted by the same reference signs and a description thereof will be omitted.

Figure 8:
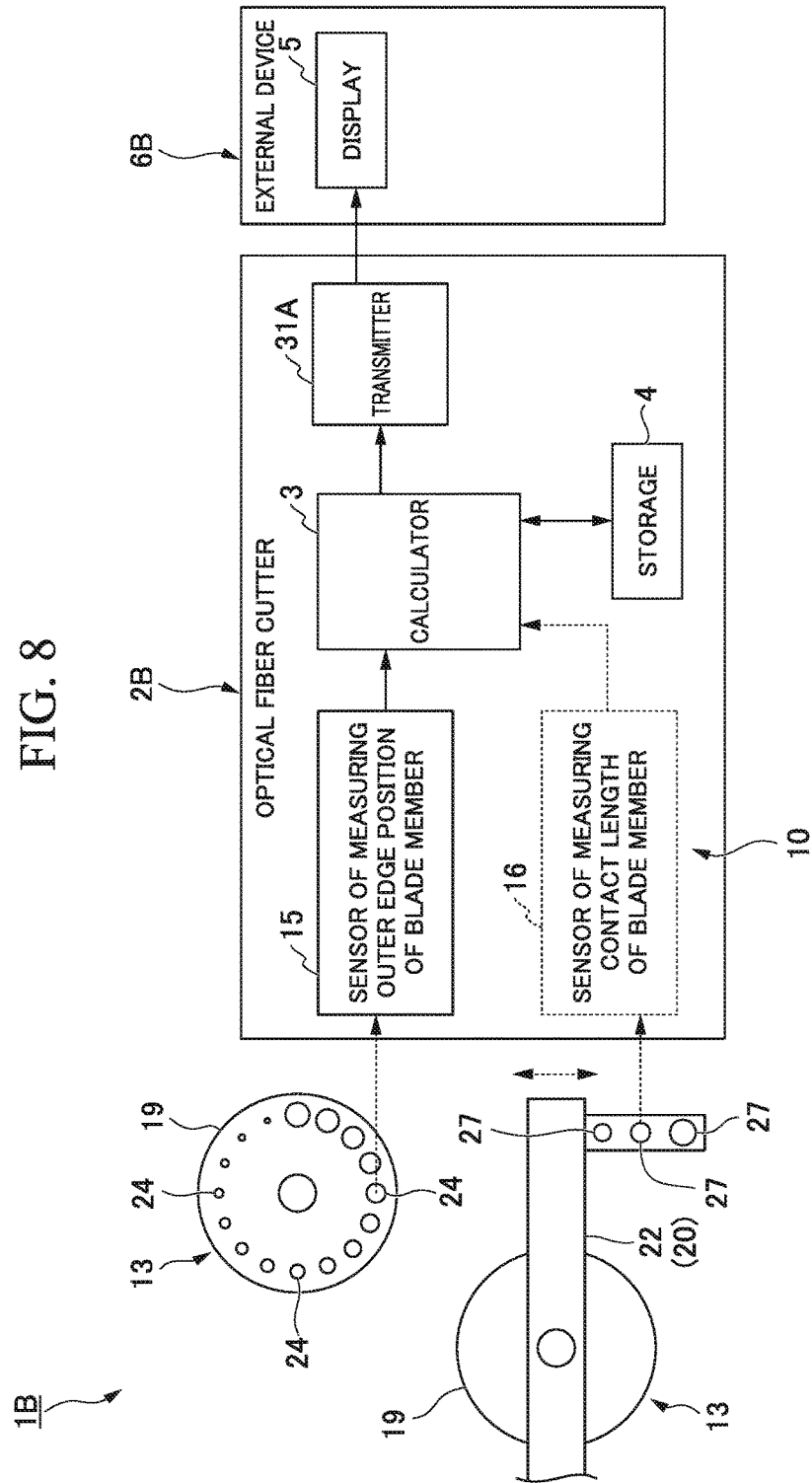
FIG. 8 is a block diagram showing an optical fiber cutting system according to a third embodiment of the invention.

As shown in FIG. 8, similar to the first embodiment, an optical fiber cutting system 1B of the embodiment includes an optical fiber cutter 2B, an outer edge position measuring sensor 15, a contact length measuring sensor 16, a calculator 3, a storage 4, and a display 5. A configuration of the optical fiber cutter 2B may be the same as that of the optical fiber cutter 2 of the first embodiment. The outer edge position measuring sensor 15 and the contact length measuring sensor 16 are provided in the optical fiber cutter 2B as in the first embodiment. Also, the functions of the calculator 3, the storage 4, and the display 5 are the same as those of the first embodiment.

However, in the optical fiber cutting system 1B of the embodiment, position information of a blade member 13 measured by the outer edge position measuring sensor 15 and the contact length measuring sensor 16 or maintenance information calculated in accordance with the position information of the blade member 13 is transmitted to an external device 6B which is separate from the optical fiber cutter 2B. That is, the optical fiber cutter 2B of the embodiment includes a transmitter 31A similar to the second embodiment.

A specific example of the external device 6B may be the same as the example described in the second embodiment.

Also, in the optical fiber cutting system 1B of the embodiment, the calculator 3 and the storage 4 are provided in the optical fiber cutter 2B, and the display 5 is provided in the external device 6B. Therefore, only the information to be displayed on the display 5 among the position information or the maintenance information of the blade member 13 is transmitted from the optical fiber cutter 2B to the external device 6B.

The optical fiber cutting system 1B of the embodiment achieves the same effect as the first and second embodiments.

In addition, according to the optical fiber cutting system 1B of the embodiment, since the display 5 is provided in the external device 6B, it is possible to reduce the size and cost of the optical fiber cutter 2B compared to the optical fiber cutting system 1B of the first embodiment.

[Fourth Embodiment]

Next, a fourth embodiment of the invention will be described mainly focusing on differences from the first and second embodiments with reference to FIG. 9. Also, components common to the first and second embodiments will be denoted by the same reference signs and a description thereof will be omitted.

Figure 9:
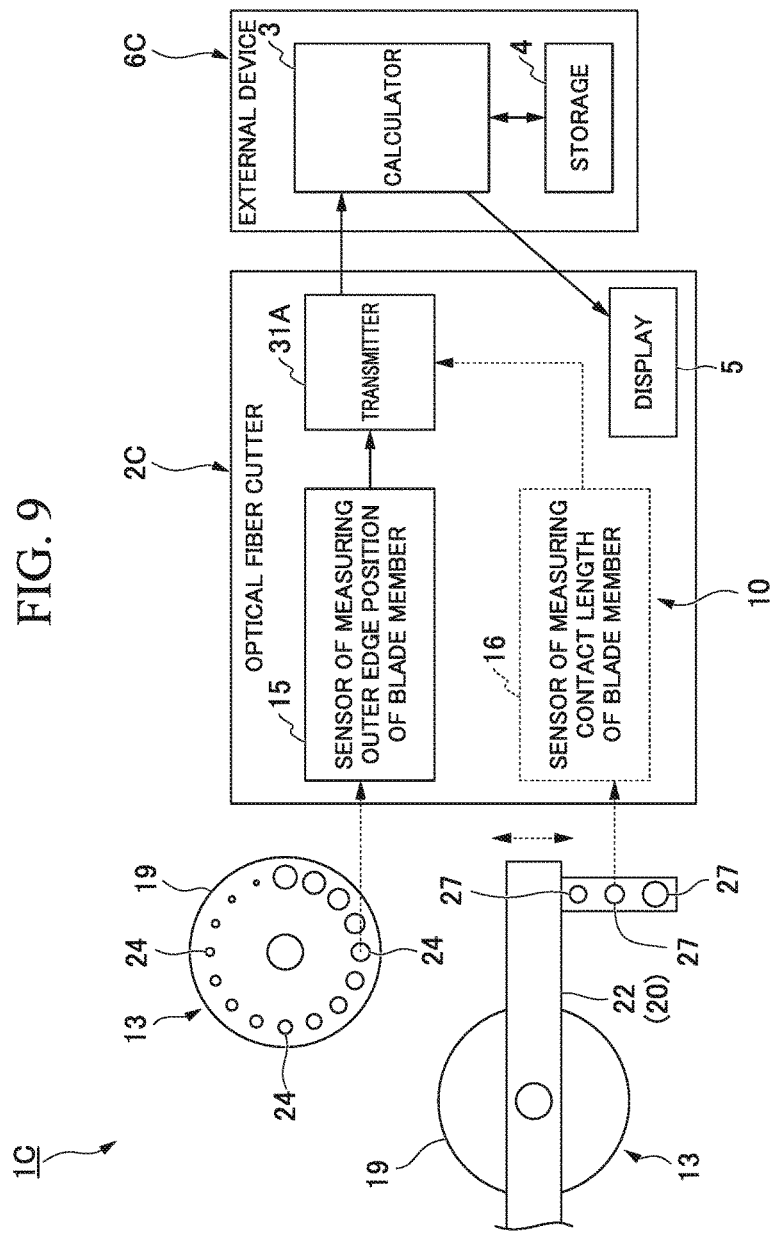
FIG. 9 is a block diagram showing an optical fiber cutting system according to a fourth embodiment of the invention.

As shown in FIG. 9, similar to the first embodiment, an optical fiber cutting system 1C of the embodiment includes an optical fiber cutter 2C, an outer edge position measuring sensor 15, a contact length measuring sensor 16, a calculator 3, a storage 4, and a display 5. A configuration of the optical fiber cutter 2C may be the same as that of the optical fiber cutter 2 of the first embodiment. The outer edge position measuring sensor 15 and the contact length measuring sensor 16 are provided in the optical fiber cutter 2C as in the first embodiment. Also, the functions of the calculator 3, the storage 4, and the display 5 are the same as those of the first embodiment.

Also, in the optical fiber cutting system 1C of the embodiment, similar to the second embodiment, position information of a blade member 13 measured by the outer edge position measuring sensor 15 and the contact length measuring sensor 16 is transmitted to an external device 6C which is separate from the optical fiber cutter 2C. That is, the optical fiber cutter 2C of the embodiment includes a transmitter 31A similar to the second embodiment.

A specific example of the external device 6C may be the same as the example described in the second embodiment.

Also, in the optical fiber cutting system 1C of the embodiment, the calculator 3 and the storage 4 are provided in the external device 6C and the display 5 is provided in the optical fiber cutter 2C. Therefore, calculation and storage of maintenance information or the like based on the position information of the blade member 13 is performed in the external device 6C.

Also, information to be displayed on the display 5 among the position information or the maintenance information of the blade member 13 is transmitted from the external device 6C to the optical fiber cutter 2C. That is, a transmitter (not shown in figure) configured to transmit the information to be displayed on the display 5 to the optical fiber cutter 2C is provided in the external device 6C. In addition, a receiver (not shown in figure) for receiving the information to be displayed on the display 5 is provided in the optical fiber cutter 2C.

The optical fiber cutting system 1C of the embodiment achieves the same effect as the first and second embodiments.

In addition, according to the optical fiber cutting system 1C of the embodiment, since the calculator 3 and the storage 4 are provided in the above-described external device 6C, it is possible to reduce the size and cost of the optical fiber cutter 2C compared to the optical fiber cutting system 1C of the first embodiment.

While details of the invention have been described above, the invention is not limited to the embodiments described above and various modifications can be made without departing from the scope of the invention.

For example, the storage 4 may be provided in the optical fiber cutters 2A and 2C in the optical fiber cutting systems 1A and 1C of the second and fourth embodiments in which the calculator 3 is provided in the external device. That is, the maintenance information calculated in the calculator 3 of the external devices 6A and 6C may be transmitted to the optical fiber cutters 2A and 2C to be stored in the storage 4 of the optical fiber cutters 2A and 2C.

Also, for example, the calculator 3, the storage 4, and the display 5 may be provided in both the optical fiber cutters 2A to 2C and the external devices 6A to 6C in the optical fiber cutting systems 1A to 1C of the second to fourth embodiments in which the optical fiber cutters 2A to 2C and the external devices 6A to 6C are included.

In the optical fiber cutting system of one or more embodiments of the invention, the information of the "Correct order of use of the blade member" to be stored in the storage in advance is not limited to the descriptions of the embodiments described above and may be arbitrarily set. The information of the "Correct order of use of the blade member" may include the following procedures A1 to E1 in sequence.

Procedure A1: An initial position of the blade member used to cut the optical fiber is set to "Blade height: low, Blade angle: No. 1".

Procedure B1: Thereafter, each time the position (Blade angle: No. 1) of the outer circumferential edge of the blade member which is to be in contact with the optical fiber is worn down, the blade height is changed in a sequence of "low"→"middle"→"high".

Procedure C1: After the position of "Blade height: high, Blade angle: No. 1" is worn down, the position is changed to "Blade height: low, Blade angle: No. 2".

Procedure D1: Thereafter, similar to "Procedure B1", each time the position at the "Blade angle: No. 2" is worn down, the blade height is changed in a sequence of "low-"→"middle"→"high".

Procedure E1: Sequentially, the blade member is used as in "Procedure B1" and "Procedure D1" while changing the position to "Blade angle: No. 16".

In the optical fiber cutting system of one or more embodiments of the invention, when a movement error of the blade member occurs due to an operator or the like in changing the position of the blade member, the warning to the operator is not limited to being displayed on the display and may also be performed by generating a sound using a speaker or the like, for example.

In the optical fiber cutting system of one or more embodiments of the invention, for example, the number of times the optical fiber has been scratched by the same outer circumferential edge and the same height position may be counted. In this case, the calculator can calculate the degree of consumption and the remaining life of the blade member in accordance with the acquired position information and the number of times of having scratched the optical fiber, for example. As a result, the information on the degree of consumption and the remaining life of the blade member can provide more precise information to the operator, compared with the cases of the above-described embodiments.

In the optical fiber cutting system of one or more embodiments of the invention, the height position of the optical fiber grasped by the pair of clamps may be adjustable, for example. In this case, the height position of the blade member may be adjustable as in the above-described embodiments, but it may also be fixed, for example.

In one or more embodiments of the invention, an image analyzer for analyzing the end face condition of the optical fiber after being cut may be provided in the optical fiber cutter, for example. In this case, when it is determined that the cutting performance of the predetermined outer circumferential edge of the blade member is degraded according to the analysis result of the end face of the optical fiber obtained by the image analyzer, for example, an instruction to change the position of the blade member with respect to the optical fiber can be displayed on the display. In addition, with the analysis result of the end face of the optical fiber obtained by the image analyzer, an appropriate timing at which the position of the blade member with respect to the optical fiber is to be changed can be calculated in the calculator or the like in accordance with the position information of the blade member, for example.

In addition, the invention is not limited to the optical fiber cutter in which the position change of the blade member with respect to the optical fiber is manually performed by an operator or the like, and can also be applied to an optical fiber cutter in which the position change of the blade member with respect to the optical fiber is automatically performed by a motor or the like, for example.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached

DESCRIPTION OF REFERENCE NUMERAL 1, 1A, 1B, 1C optical fiber cutting system
2, 2A, 2B, 2C optical fiber cutter
3 calculator
4 storage
5 display
6A, 6B, 6C external device
10 acquirer
11, 12 clamp
13 blade member
14 pressing member
15 outer edge position measuring sensor
16 contact length measuring sensor (position measuring sensor)
19 outer circumferential edge
24 marker
27 marker
31A transmitter
100 optical fiber

The invention claimed is:

1. An optical fiber cutting system comprising:
   a pair of clamps disposed at an interval in a longitudinal direction of an optical fiber and that grasps the optical fiber;
   a disk-shaped blade member that passes between the pair of clamps, causes an outer circumferential edge to come into contact with the optical fiber, and scratches a surface of the optical fiber, wherein a position of the outer circumferential edge which is to be in contact with the optical fiber is changeable;
   a pressing member that press-bends a scratched portion of the optical fiber and that breaks the optical fiber; and
   an acquirer that acquires position information of the outer circumferential edge which is to be in contact with the optical fiber.

2. The optical fiber cutting system according to claim 1, wherein
   the acquirer includes an outer edge position measuring sensor that measures a rotation angle of the blade member as the position information to be acquired.

3. The optical fiber cutting system according to claim 1, wherein
   the blade member moves in a direction perpendicular to the longitudinal direction,
   a relative position between the optical fiber and the outer circumferential edge in a height direction perpendicular to a movement direction of the blade member and the longitudinal direction of the optical fiber is changeable, and wherein
   the acquirer further acquires information on the relative position between the optical fiber and the outer circumferential edge in the height direction.

4. The optical fiber cutting system according to claim 3, wherein
   the acquirer further includes a position measuring sensor that measures a position of the outer circumferential edge in the height direction as the information on the relative position.

5. The optical fiber cutting system according to claim 1, further comprising:
   a calculator that calculates maintenance information on the blade member according to the position information acquired by the acquirer.

6. The optical fiber cutting system according to claim 5, further comprising:
   storage that stores at least one of the position information and the maintenance information.

7. The optical fiber cutting system according to claim 5, further comprising:
   a display that displays at least one of the position information and the maintenance information.

8. The optical fiber cutting system according to claim 5, further comprising:
   a transmitter that transmits at least one of the position information and the maintenance information, from an optical fiber cutter to an external device which is separate from the optical fiber cutter, the optical fiber cutter including the pair of clamps, the blade member, the pressing member, and the acquirer.

9. The optical fiber cutting system according to claim 8, wherein
   the calculator is provided in the external device, and
   the maintenance information calculated in the calculator of the external device is transmitted to the optical fiber cutter and is stored in storage provided in the optical fiber cutter.

10. The optical fiber cutting system according to claim 8, wherein
    the calculator is provided in the external device, and
    the maintenance information calculated in the calculator of the external device is transmitted to the optical fiber cutter and is displayed on a display provided in the optical fiber cutter.

11. The optical fiber cutting system according to claim 8, wherein
    at least one of the position information and the maintenance information is associated with connection data to be collected by a fusion splicer that connects the optical fibers to each other and is stored in storage provided in the external device.

* * * * *